US012564740B2

(12) United States Patent
Cao et al.

(10) Patent No.:   US 12,564,740 B2
(45) Date of Patent:       Mar. 3, 2026

(54) METHOD, APPARATUS FOR TEMPERATURE DETECTION AND WEARABLE DEVICE

(71) Applicant: KONINKLIJKE PHILIPS N.V., Eindhoven (NL)

(72) Inventors: Xueming Cao, Shanghai (CN); Tao Kong, Shanghai (CN); Wei Gu, Shanghai (CN); Weizhong Chen, Shanghai (CN)

(73) Assignee: Koninklijke Philips N.V., Eindhoven (NL)

( * ) Notice: Subject to any disclaimer, the term of this patent is extended or adjusted under 35 U.S.C. 154(b) by 519 days.

(21) Appl. No.: 17/784,338

(22) PCT Filed: Dec. 18, 2020

(86) PCT No.: PCT/EP2020/087000
§ 371 (c)(1),
(2) Date: Jun. 10, 2022

(87) PCT Pub. No.: WO2021/130113
PCT Pub. Date: Jul. 1, 2021

(65) Prior Publication Data
US 2023/0048877 A1      Feb. 16, 2023

(30) Foreign Application Priority Data

Jan. 23, 2020    (EP) ..................................... 20153292

(51) Int. Cl.
*A62B 18/08*       (2006.01)
*G01K 1/14*       (2021.01)
(Continued)

(52) U.S. Cl.
CPC ................ *A62B 18/08* (2013.01); *G01K 1/14* (2013.01); *G01K 7/00* (2013.01); *G01K 13/00* (2013.01)

(58) Field of Classification Search
CPC . G01K 7/00; G01K 13/00; G01K 1/14; A62B 18/08
See application file for complete search history.

(56) References Cited

U.S. PATENT DOCUMENTS

2011/0205071 A1    8/2011   Namekawa
2014/0321503 A1   10/2014   Niederberger
(Continued)

FOREIGN PATENT DOCUMENTS

EP        2728327 A1    5/2014
EP        2963402 A1    1/2016
(Continued)

OTHER PUBLICATIONS

International Search Report and Written Opinion Dated Apr. 1, 2021 for International Application No. PCT/EP2020/087000 Filed Dec. 18, 2020.
(Continued)

*Primary Examiner* — Mirellys Jagan

(57)                ABSTRACT

Embodiments of the present disclosure provide a method for temperature detection. The method comprises obtaining a sensed temperature from a sensor, the sensor being in a mounted mode where the sensor is thermally radiated by a variable heat source and a fixed heat source; determining a temperature change rate of the sensor and at least one affecting factor that affects temperature sensing of the sensor; and determining a temperature of the variable heat source based on the sensed temperature, the temperature change rate, and the affecting factor. According to the method of the present disclosure, the temperature of the variable heat source such as an ambient temperature can be
(Continued)

obtained or determined without a dedicated sensor and cables. With this method, the ambient temperature can be determined by a sensor for sensing a temperature of a heating element such as a battery, a control unit or the like. In this way, extra spaces and product designs for mounting a dedicated sensor for the ambient temperature are no longer needed, which reduces costs of the product. Furthermore, user experience can be improved without increasing costs.

5 Claims, 3 Drawing Sheets

(51) Int. Cl.
  G01K 7/00        (2006.01)
  G01K 13/00       (2021.01)

(56)                References Cited

U.S. PATENT DOCUMENTS

| | | |
|---|---|---|
| 2015/0177076 A1 | 6/2015 | Claus |
| 2015/0292959 A1 | 10/2015 | Graf |

| | | |
|---|---|---|
| 2016/0003692 A1 | 1/2016 | Ng |
| 2016/0146678 A1* | 5/2016 | Kalyanasundaram ... G01K 7/42 |
| | | 374/152 |
| 2016/0245706 A1 | 8/2016 | Zivkovic |
| 2018/0245986 A1 | 8/2018 | Pan |
| 2019/0012904 A1* | 1/2019 | Yusuf ................... G08B 21/182 |
| 2019/0187765 A1* | 6/2019 | Ashwood ............... H04B 1/385 |

FOREIGN PATENT DOCUMENTS

| | | | |
|---|---|---|---|
| EP | 3062077 A1 | 8/2016 | |
| WO | 2019/025374 A1 | 2/2019 | |

OTHER PUBLICATIONS

Written Opinion of the International Preliminary Examining Authority Dated Jul. 1, 2021 for International Application No. PCT/EP2020/087000 Filed Dec. 18, 2020.

International Preliminary Report on Patentability Dated Jul. 7, 2022 for International Application No. PCT/EP2020/087000 Filed Dec. 18, 2020.

* cited by examiner

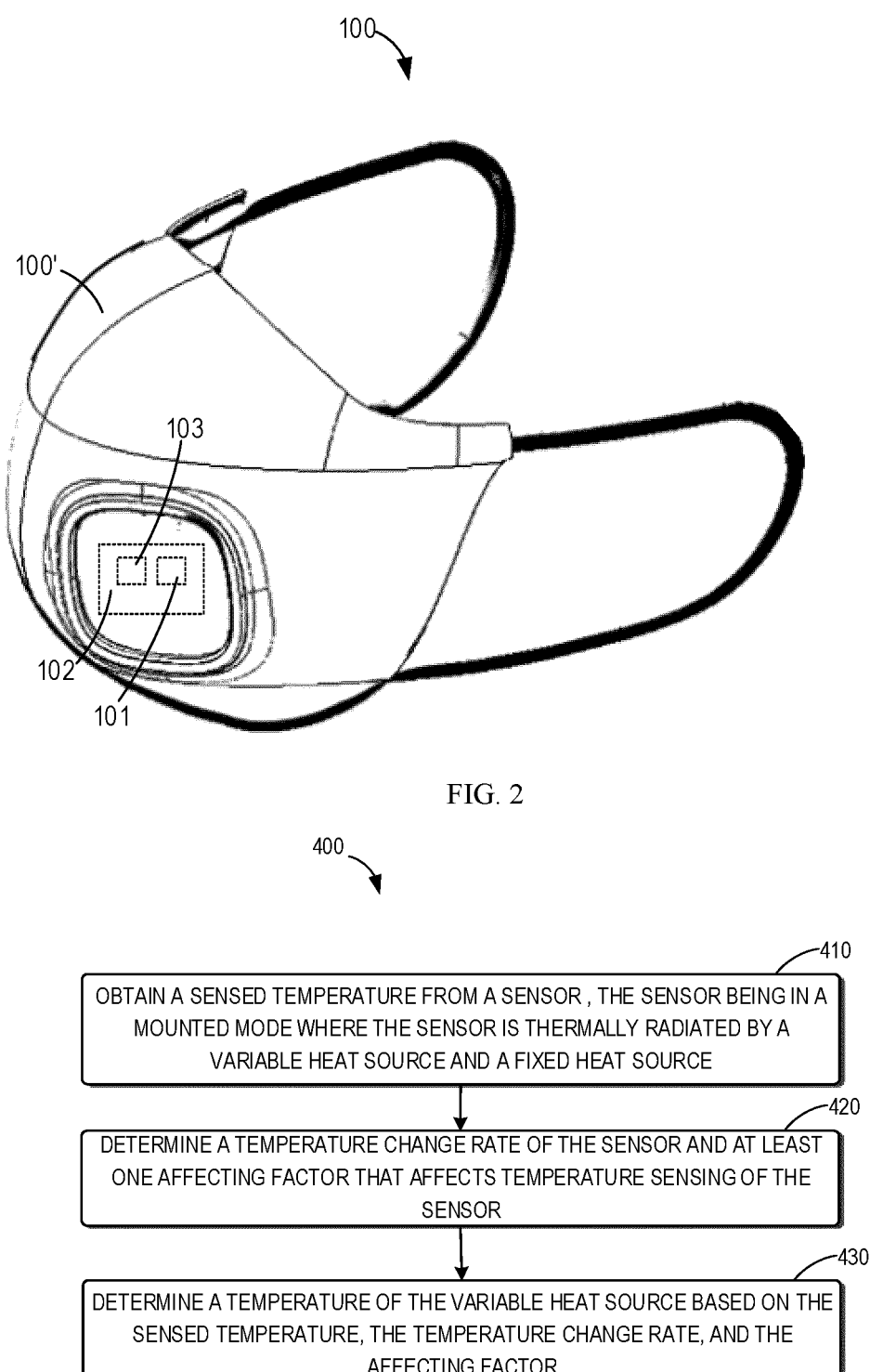

OBTAIN A SENSED TEMPERATURE FROM A SENSOR , THE SENSOR BEING IN A MOUNTED MODE WHERE THE SENSOR IS THERMALLY RADIATED BY A VARIABLE HEAT SOURCE AND A FIXED HEAT SOURCE ⌐410

DETERMINE A TEMPERATURE CHANGE RATE OF THE SENSOR AND AT LEAST ONE AFFECTING FACTOR THAT AFFECTS TEMPERATURE SENSING OF THE SENSOR ⌐420

DETERMINE A TEMPERATURE OF THE VARIABLE HEAT SOURCE BASED ON THE SENSED TEMPERATURE, THE TEMPERATURE CHANGE RATE, AND THE AFFECTING FACTOR ⌐430

METHOD, APPARATUS FOR TEMPERATURE DETECTION AND WEARABLE DEVICE

CROSS REFERENCE TO RELATED APPLICATIONS

This application is the U.S. National Phase application under 35 U.S.C. § 371 of International Application No. PCT/EP2020/087000 filed Dec. 18, 2020, which claims the benefit of European Patent Application Number 20153292.6 filed Jan. 23, 2020 and International Application No. PCT/CN2019/129337 filed Dec. 27, 2019. These applications are hereby incorporated by reference herein.

FIELD OF THE INVENTION

Embodiments of the present disclosure generally relate to a wearable device, and more specifically, to a method and an apparatus for temperature detection.

BACKGROUND OF THE INVENTION

Ambient temperature is a physical quantity used to indicate the degree of a hot and cold environment. It is important to monitor the ambient temperature in some cases, especially for perception related products. Based on the ambient temperature, the products could adjust their performances so users can be more comfortable when using the same products at different temperatures. One example is an active mask with a fan to take away the exhaust gases inside the mask. At different temperatures, the requirement for the fan speed is different. For example, in summer when the ambient temperature is high, users typically prefer a higher fan speed to discharge the exhaust gas away together with the heat inside the mask more quickly. In winter when the ambient temperature is low, it is better for the fan to have a lower speed to keep heat inside the mask.

To monitor the ambient temperature, typically a dedicated temperature sensor is provided at the outside layer of a product. Consequently, dedicated cables are necessary for communication between this sensor and, for example, a control unit or a transmission unit. The main problems that follow are extra spaces required for the sensor and cables, and a product design that must be changed, resulting in increased costs. Furthermore, due to the proximity to heat sources such as the human body, the sensed ambient temperature is less accurate.

SUMMARY OF THE INVENTION

Embodiments of the present disclosure provide an apparatus and a method for temperature detection.

In a first aspect, a method for determining a temperature of a physical environment around a wearable device is provided. The method comprises obtaining a sensed temperature from a sensor indicating an internal temperature inside the wearable device, the sensor being in a mounted mode where the sensor is thermally radiated by the physical environment and a constant temperature object wearing the wearable device; determining a temperature change rate of the sensor and at least one affecting factor that affects temperature sensing of the sensor; and determining the temperature of the physical environment based on the sensed temperature, the temperature change rate, and the at least one affecting factor.

According to the method of the present disclosure, the temperature of the variable heat source such as an ambient temperature can be obtained or determined without a dedicated sensor and cables. With this method, the ambient temperature can be determined by a sensor for sensing a temperature of a heating element such as a battery, a control unit or the like. In this way, extra spaces and product designs for mounting a dedicated sensor for the ambient temperature are no longer needed, which reduces costs of the product. Furthermore, user experience can be improved without increasing costs.

In some embodiments, the at least one affecting factor comprises at least one of the following: a first affecting factor that affects the temperature change rate, a second affecting factor that affects the sensed temperature, and a third affecting factor that affects an intermediate temperature determined based on the sensed temperature and the temperature change rate. In this way, the determined temperature of the variable heat source can be more accurate.

In some embodiments, determining the at least one affecting factor comprises: determining the first affecting factor at least based on a power generated by an active component on a printed circuit board where the sensor is mounted, and a first equivalent thermal conductivity around the sensor and wherein the first equivalent thermal conductivity is associated with an equivalent thermal conductivity from the physical environment to the sensor and an equivalent thermal conductivity from the PCB to the physical environment. With this step, the first affecting factor associated with the temperature change rate can be determined accurately.

In some embodiments, determining the at least one affecting factor comprises: determining the second affecting factor at least based on a power generated by an active component on a printed circuit board where the sensor is mounted, and a second equivalent thermal conductivity around the sensor and wherein the second equivalent thermal conductivity is associated with an equivalent thermal conductivity from the physical environment to the sensor, an equivalent thermal conductivity from the PCB to the physical environment, an equivalent thermal conductivity from the constant temperature object to the sensor, and an equivalent thermal conductivity from the PCB to the constant temperature object. In this way, the second affecting factor associated with the sensed temperature can be determined accurately.

In some embodiments, determining the at least one affecting factor comprises: determining the third affecting factor at least based on a temperature of the fixed heat source, a power generated by an active component on a printed circuit board where the sensor is mounted, and a third equivalent thermal conductivity around the sensor, and wherein the second equivalent thermal conductivity is associated with an equivalent thermal conductivity from the physical environment to the sensor, an equivalent thermal conductivity from the PCB to the physical environment, an equivalent thermal conductivity from the constant temperature object to the sensor, and an equivalent thermal conductivity from the PCB to the constant temperature object. This step provides a more accurate third affecting factor.

In some embodiments, determining the temperature change rate comprises: obtaining a plurality of historical temperatures sensed by the sensor over a period of time; and determining the change rate based on the plurality of historical temperatures and the period of time. As a result, the temperature change rate can be determined easily.

In some embodiments, determining the at least one affecting factor comprises: obtaining a plurality of temperatures of the variable heat source which are sensed by a further sensor over a plurality of predetermined periods of time; obtaining a start temperature and an end temperature sensed by the sensor for a predefined time slot within each of the plurality of predetermined periods of time; and determining the at least one affecting factor at least based on the plurality of temperatures of the variable heat source. In this way, the determination of the affecting factor is made easier.

In some embodiments, the plurality of temperatures of the physical environment are different. This arrangement can ensure the determination of the affecting factor.

In a second aspect, an apparatus for determining a temperature of a physical environment around a wearable device is provided. The method comprises a sensor adapted to be arranged in a mounted mode where the sensor is thermally radiated by the physical environment and a constant temperature object; and a processor coupled to the sensor and configured to determine a temperature of the physical environment.

In some embodiments, the apparatus further comprises a printed circuit board adapted to carry the sensor.

In some embodiments, the apparatus is adapted to be arranged on the wearable device worn by the constant temperature object.

In a third aspect, a wearable device is provided. The wearable device comprises an apparatus for temperature detection as mentioned in the above second aspect adapted to determine a temperature of a physical environment around the constant temperature object.

In some embodiments, the apparatus is arranged on a side of the wearable device adjacent to the constant temperature object.

In some embodiments, the apparatus is configured such that a sensor of the apparatus is thermally radiated by the physical environment and the constant temperature object, in a case where the wearable device is worn on the constant temperature object.

In some embodiments, the wearable device further comprises a mask.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through a more detailed depiction of example embodiments of the present disclosure in conjunction with the accompanying drawings, wherein in the example embodiments of the present disclosure, same reference numerals usually represent the same components.

FIG. 2 shows an apparatus according to embodiments of the present disclosure by taking a mask as an example;

FIG. 3 shows a flowchart illustrating a method for temperature detection according to embodiments of the present disclosure.

Throughout the drawings, the same or similar reference symbols are used to indicate the same or similar elements.

DETAILED DESCRIPTION OF THE EMBODIMENTS

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

With the development of technology, requirements for smart wearable devices such as clothes or masks are increasing. For example, an active mask with a fan has been developed to take away the exhaust gases inside a mask to improve the user's experience. In some cases, the fan speed can be adjusted according to ambient temperature. Specifically, in summer when the ambient temperature is high, users prefer a higher fan speed to discharge the exhaust gas away together with the heat inside the mask more quickly. In winter when the ambient temperature is low, it is better for the fan to have a lower speed to keep heat inside the mask.

The above example scenario requires monitoring of the ambient temperature. Actually, it is important to monitor the ambient temperature in some cases, especially for perception related products. Based on the ambient temperature, the products could adjust their performance so users can be more comfortable when using the same products at different temperatures.

Conventionally, typically a dedicated temperature sensor is provided at the outside layer of a product to monitor the ambient temperature. In addition, dedicated cables are necessary for communication between this sensor and a control unit or a transmission unit, for example. It will be appreciated that extra spaces are required for the sensor and cables, which will result in increased costs and a need for product redesign. It is also typical to set up a dedicated sensor, but due to proximity to heat sources such as a human body, the sensed ambient temperature is less accurate.

Figure 1:
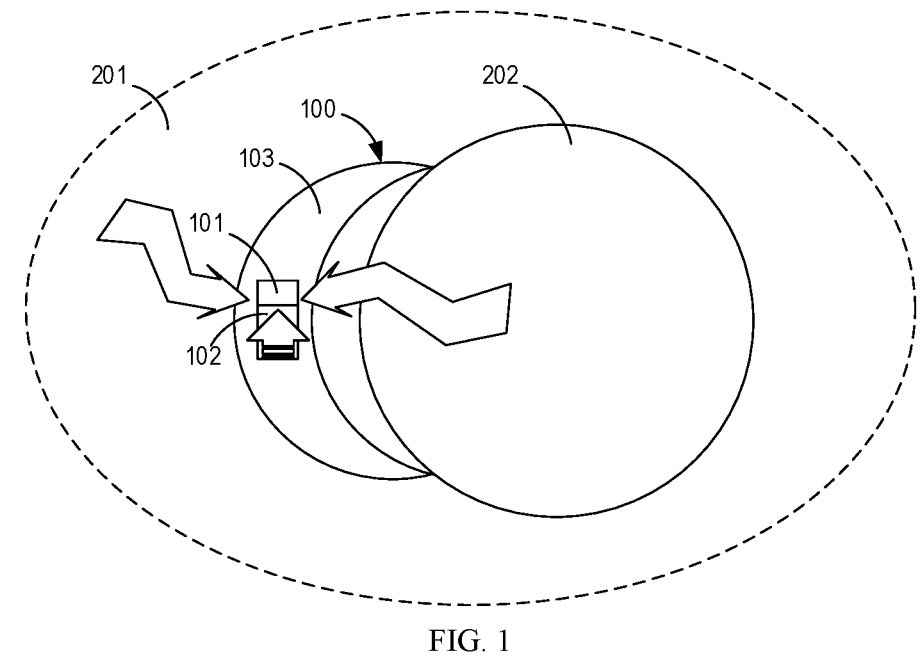
FIG. 1 shows a schematic diagram illustrating an example application of the method according to embodiments of the present disclosure.
Figure 4:
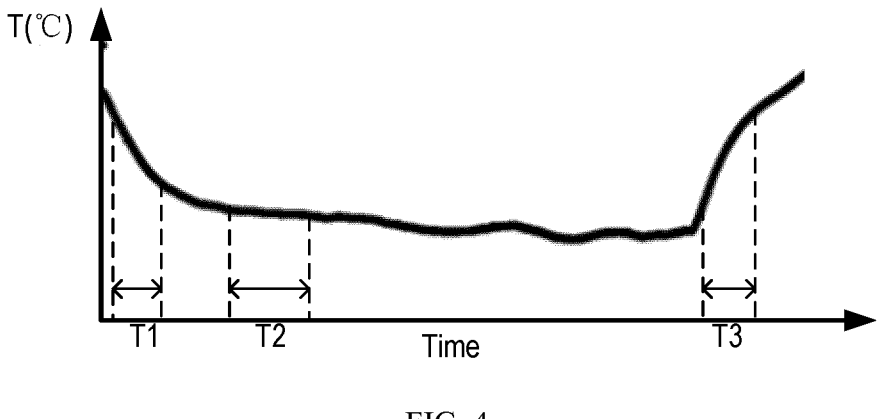
FIG. 4 shows a graph of temperature over time for a variable heat source according to embodiments of the present disclosure.

Embodiments of the present disclosure provide an apparatus 100 and method for measuring the ambient temperature. FIG. 1 shows a schematic diagram illustrating an example application of the method and the apparatus according to embodiments of the present disclosure.

According to embodiments of the present disclosure, the ambient temperature around the apparatus 100 can be determined with a sensor 101 used for safety. For example, in some embodiments, the sensor 101 may be used to measure a temperature of a heating source such as a battery or a control unit.

FIG. 2 shows an apparatus according to embodiments of the present disclosure by taking a mask 100' as an example. The mask 100' as shown in FIG. 2 belongs to a kind of smart mask, which includes a printed circuit board (PCB) 102, a sensor 101 arranged on the PCB and other related components, such as a controller 103. For example, in some embodiments, the sensor 101 is typically arranged inside the mask 100' and can obtain an internal temperature inside the mask 100'. The controller 103 can then control actions of some other components according to the obtained tempera-ture, such as controlling the rotation of a fan. According to embodiments of the present disclosure, the ambient tem-perature around the apparatus 100, i.e., the mask 100', can be determined from the internal temperature obtained by the sensor 101, without the need to provide an additional dedicated sensor.

After analysis, the inventor found that the sensor 101 in the mask 100' is not only affected by the temperature inside the mask (such as human body temperature), but also by the ambient temperature and the components on the PCB. When a person wears a mask, the ambient temperature of physical environment around the mask 100' is constantly changing. For example, when a person wearing a mask enters from cold outside to warm inside, the ambient temperature around the mask increases, while the human body temperature of the person as a constant temperature object remains basi-cally constant. In this event, the physical environment around the mask 100' belongs to a variable heat source while the constant temperature object, i.e., the human body of a user, belongs to a fixed heat source for the sensor 101. Based on this discovery, the inventor proposed the concept of the present disclosure, that is, the temperature of any variable heat source such as the ambient temperature also can be determined as long as the sensor 101 is thermally radiated by the variable heat source 201 and a fixed heat source 202.

In the following, a wearable device such as the mask 100' as shown in FIG. 2 will be mainly used as an example and combined with the simplified diagram shown in FIG. 1 to describe the principle of the present disclosure. It should be understood that the present application is also applicable to other sensors with similar scenes, and will not be described separately in the following. As shown in FIG. 1, the sensor 101 is thermally radiated by the physical environment as a variable heat source 201, the constant temperature object such as a user's face as a fixed heat source 202, and a printed circuit board (PCB) 102 where the sensor 101 is mounted. Examples of the heating source on the PCB include, but are not limited to, a battery, a control unit, a processor, or the like. It is to be understood that the PCB 102 is discussed only for illustrative purposes, without suggesting any limitation as to the scope of the present disclosure. In some embodi-ments, the PCB 102 can be omitted or refer to an integrated circuit of the sensor 101. That is, the sensor 101 may also be arranged in the apparatus 100 without a PCB.

It is also to be understood that the sensor 101 may be any kind of sensor used for safety or other situations, as long as the sensor 101 can be thermally radiated by physical envi-ronment and a constant temperature object when in the mounted mode, for example, when the mask 100' is worn by a user. For example, in some embodiments, the sensor 101 may be a thermistor.

It is to be understood that the variable heat source 201 is any object that radiates heat that varies over time. As mentioned above, an example of the variable heat source 201 is the physical environment around the apparatus 100. In this situation, the temperature of the variable heat source 201 to be determined is the ambient temperature. The fixed heat source 202 means any object that radiates heat con-stantly. As mentioned above, examples of the fixed heat source 202 may be a constant temperature object such as a human body or other objects or heated bodies that constantly radiate heat.

For ease of discussion, the physical environment around the apparatus 100 (i.e., a mask) and a constant temperature object such as a human body will correspond to the variable heat source 201 and the fixed heat source 202, respectively. It is to be understood that this is merely for illustrative purposes, without suggesting any limitation as to the scope of the present disclosure. Temperatures of any other suitable variable heat source 201 may also be determined according to embodiments of the present disclosure, as long as the sensor 101 is thermally radiated by the fixed heat source 202 and the variable heat source 201.

For example, in some alternative embodiments, the vari-able heat source may comprise, but is not limited to, heated objects operating at variable power such as a computer, household appliances, or the like. The fixed heat source may comprise heated objects operating at fixed power, such as an incandescent lamp.

Furthermore, it is to be understood that the mounted mode means that the apparatus 100 is mounted where it is needed or should be mounted. Take a mask as an example, the mounted mode means that the mask is worn on the user's face. In this way, the temperature of the fixed heat source 202 remains constant regardless of the ambient temperature, resulting in a more accurate determination of the ambient temperature serving as the variable heat source 201.

As mentioned above, the sensor 101 is used to sense an internal temperature inside the mask 100'. It should be understood that the internal temperature herein is described relative to the ambient temperature as an external tempera-ture. The internal temperature measured by the sensor herein may include, but is not limited to: the temperature inside the mask or the temperature of electronic devices such as batteries. For example, in some embodiments, the sensor 101 is used to monitor the failure of a battery. In case of the failure of the battery, its temperature would increase quickly, resulting in a quick change of sensed temperature. When the sensed temperature exceeds a predetermined threshold, an alarm or protection may be triggered.

Conventionally, in a normal state of the battery, the data from the sensor 101 is typically neglected. After research, the inventors developed the method and apparatus 100 according to embodiments of the present application, to use this neglected data to determine the ambient temperature, without dedicated sensors. The development of the method is based on a transient thermal balance equation.

Typically, according to the transient thermal balance equation, we can obtain the heat flux density with the equation below:

$$q = -\lambda \cdot \nabla T \qquad (1)$$

where q represents the local heat flux density with a unit of W/m$^2$, $\lambda$ represents a thermal conductivity of the heat transfer medium, and $\nabla T$ represents a temperature gradient. It can be seen that there is a linear relationship between the energy received and the temperature increase in the sensor 101.

The inventors have found that the temperature change of the sensor 101 is affected by a temperature of a constant temperature object such as a human body or a portion thereof such as a user's face, the ambient temperature, and the power generated by active components of the PCB (if any). Specifically, in the case where the mask is in the mounted mode, the heat transfer medium between the human body and the sensor 101 and between the physical environment around the mask and the sensor 101 typically remains substantively unchanged. For example, the heat transfer medium between the human body and the sensor

101 may comprise air inside the mask, a housing of the sensor 101 and an inner layer of the mask. Since materials and arrangements of the above objects when the mask is worn on a human body are invariant, for the sake of simplicity, these materials along with their arrangements may be equivalent to a virtual material with an equivalent heat transfer conductivity. This equivalent heat transfer conductivity is used to determine the temperature change rate of the sensor 101, which will be discussed further below.

Similarly, the heat transfer medium between the physical environment around the mask and the sensor 101 may also be equivalent to a virtual material with a further equivalent heat transfer conductivity. This equivalent heat transfer conductivity is also used to determine the temperature change rate of the sensor 101.

Based on the above knowledge, the inventors established a physical model to include all factors that may affect the temperature of the sensor during the wearing of the mask. Since the heat transfer medium around the mask remains basically unchanged during wearing, the factors that affect the temperature of the sensor can be summarized as including the following aspects: the temperature of components arranged on the printed circuit board (PCB) where the sensor is mounted, the thermal conductivity around the sensor, the user's face temperature, i.e., human body temperatyre, and the ambient temperature.

Considering the above factors and equation (1), we can obtain an equation below:

$$a_1 \frac{dT_{NTC}}{dt} = \lambda_{face} \cdot (T_{face} - T_{NTC}) + \lambda_{env} \cdot (T_{env} - T_{NTC}) + P'_{pcb} \tag{2}$$

where $a_1$ is the coefficient between temperature increase and energy received by the sensor, $T_{NTC}$ is the temperature of the sensor, i.e., equal to the sensed temperature by the sensor, t is time, $\lambda_{face}$ is the equivalent thermal conductivity from face to the sensor, $\lambda_{env}$ is the equivalent thermal conductivity from the physical environment to the sensor, $T_{face}$ is the user's face temperature, $T_{env}$ is environmental temperature or the ambient temperature. Since there are some active components on the PCB which could generate heat, some of the heat power can be received by the thermistor directly via PCB, these power is $P'_{pcb}$.

Regarding the power generated by active components of the PCB as mentioned above, after analysis, the inventors have found that the power generated by active components of the PCB substantially contributes to the physical environment, to the human body and to other areas on the PCB where the sensor 101 is mounted. Depending on the different heat transfer conductivity for the above three ways, the power generated by the active components contributes to the sensor 101 more quickly than to the physical environment and to the human body.

By assuming that the power generated by the active components on the PCB has a constant temperature contribution in the dimensional space, we can determine the power contributed to the sensor 101 by subtracting the part of the power contributed to the physical environment and the human body. The part of the power distributed to the physical environment and the human body is associated with differences between the temperatures of the PCB and the faces, and between the temperature of the PCB and the ambient temperature.

As for the temperature of the PCB, it has been found through research that the temperature of the PCB has a linear relationship with the sensed temperature of the sensor 101. Consequently, the temperature of PCB can be expressed by an equivalent temperature, which is determined by multiplying the sensed temperature by a factor. In this way, the power contributed to the sensor 101 by the PCB can be determined with an equation below.

$$P'_{pcb} = P_{pcb}[1 - \lambda_{pcb1}(a_2 T_{NTC} - T_{env}) - \lambda_{pcb2}(a_2 T_{NTC} - T_{face})] \tag{3}$$

where $P_{pcb}$ is the power generated by the active components on PCB, $a_2 T_{NTC}$ represents the equivalent temperature of PCB when it distribute power to the physical environment and the constant temperature object such as user's face, $\lambda_{pcb1}$ is the equivalent thermal conductivity from the PCB to environment, $\lambda_{pcb2}$ is the equivalent thermal conductivity from the PCB to customer face.

From the above equations (2) and (3), we can obtain an equation (4) as below:

$$T_{env} = A \cdot \frac{dT_{NTC}}{dt} + B \cdot T_{NTC} + C \tag{4}$$

$$A = a_1 / (\lambda_{env} + P_{pcb} \cdot \lambda_{pcb1}) \tag{5}$$

$$B = \frac{\lambda_{face} + \lambda_{env} + P_{pcb} \cdot a_2(\lambda_{pcb1} + \lambda_{pcb2})}{\lambda_{env} + P_{pcb} \cdot \lambda_{pcb1}} \tag{6}$$

$$C = -\frac{\lambda_{face} \cdot T_{face} + P_{pcb} + P_{pcb} \cdot \lambda_{pcb2} \cdot T_{face}}{\lambda_{env} + P_{pcb} \cdot \lambda_{pcb1}} \tag{7}$$

where $$\frac{dT_{NTC}}{dt}$$

refers to the Temperature change rate; $T_{NTC}$ refers to the sensed temperature; A refers to a first affecting factor that affects the temperature change rate; B refers to a second affecting factor that affects the sensed temperature; and C refers to a third affecting factor that affects an intermediate temperature determined based on the sensed temperature and the temperature change rate.

It can be seen from the above equations (5)-(7) that besides the power $P_{pcb}$ generated by the active components on the PCB, the first affecting factor A is also associated with an equivalent thermal conductivity $\lambda_{env}$ from the physical environment to the sensor 101, and an equivalent thermal conductivity $\lambda_{pcb1}$ from the PCB to the environment, which will be referred to as a first equivalent thermal conductivity.

Similarly, besides the power $P_{pcb}$ generated by the active components on the PCB, the second affecting factor B is associated with an equivalent thermal conductivity $\lambda_{env}$ from the physical environment (i.e., a variable heat source) to the sensor, an equivalent thermal conductivity $\lambda_{pcb1}$ from the PCB to the physical environment, an equivalent thermal conductivity $\lambda_{face}$ from a constant temperature object such as a user's face (i.e., the fixed heat source 202) to the sensor 101, and an equivalent thermal conductivity $\lambda_{pcb2}$ from the PCB to the face, which will be referred to as a second equivalent thermal conductivity.

Besides the power $P_{pcb}$ generated by the active components on the PCB, the third affecting factor C may be associated with an equivalent thermal conductivity $\lambda_{env}$ from the physical environment (i.e., a variable heat source) to the sensor 101, an equivalent thermal conductivity $\lambda_{pcb1}$ from the PCB to the environment, an equivalent thermal conductivity $\lambda_{face}$ from a constant temperature object such as a user's face (i.e., the fixed heat source 202) to the sensor 101, and an equivalent thermal conductivity $\lambda_{pcb2}$ from the PCB to the face, which will be referred to as a third equivalent thermal conductivity.

In the case of a person wearing a mask, that is, when the sensor is measuring the internal temperature, these values of $\lambda_{pcb1}$, $\lambda_{pcb2}$, $\lambda_{face}$ and $\lambda_{env}$ as shown in the above equations (5)-(7) for determining A, B and C are basically unchanged, and can be obtained by appropriate means such as a look-up table. $P_{pcb}$ can be roughly obtained from the rated power consumption or average power consumption of the electronic components on the PCB. In this way, the first, second and third affecting factors A, B, C can be determined from equations (5)-(7). In some alternative embodiments, the at least one affecting factor may also be determined by calibration, which will be discussed further below.

By performing the above analyses on the factors that affect the sensor temperature change, a relationship between the ambient temperature, a temperature change rate of the sensor 101, and the sensed temperature can be determined. With the determined relationship, the ambient temperature can be determined based on the sensed temperature, the temperature change rate, and affecting factors.

In the above mentioned relationship, the sensed temperature can be obtained from the sensor 101, and the temperature change rate of the sensor 101 can be determined from the sensed temperature that has been obtained. Furthermore, the affecting factors are constants, which can be obtained or determined by various ways, which will be discussed further below. That is, with the above relationship, the ambient temperature can be determined by using the sensed temperature from the sensor 101 and some constants.

Through the above analyses, the inventors have developed a method for determining the temperature of a variable heat source from the sensor 101 in the mounted mode where the sensor 101 is thermally radiated by the variable and fixed heat sources. FIG. 2 shows a flowchart illustrating the method for temperature detection according to embodiments of the present disclosure.

As shown, in block 410 of flowchart 400, a sensed temperature is obtained from the sensor 101. After several historical temperatures sensed by the sensor 101 over a period of time are obtained, the temperature change rate of the sensor 101 can be determined, as shown in block 420. That is, in some embodiments, the temperature change rate may be determined based on the historical temperatures over the period of the time. In some alternative embodiments, the temperature change rate may also be determined directly from the sensor 101.

In the meantime, as shown in block 420, at least one affecting factor that affects the temperature sensing of the sensor 101 can be determined. As mentioned above, the at least one affecting factor is associated with the parameters including, but not limited to, the equivalent thermal conductivities around the sensor, power generated by active components on the PCB, and the temperature of the fixed heat source. For the same batch of the masks, for example, the affecting factors are constants and may be built into a processor or a control unit in advance.

In some embodiments, the at least one affecting factor may be determined based on the above parameters. For example, after the above parameters are obtained by various means, the affecting factor can be determined according to the relationship between the parameters and the affecting factor.

After the temperature change rate of the sensor 101 and the affecting factors are determined, in block 430, the temperature of the variable heat source 201, i.e., the ambient temperature in some embodiments, can be determined based on the sensed temperature, the temperature change rate, and the affecting factors.

According to embodiments of the present disclosure, the temperature of the variable heat source 201 such as ambient temperature can be obtained or determined without a dedicated sensor and cables. For example, in some embodiments, the ambient temperature can be determined by a sensor 101 for other purposes such as safety, better temperature monitoring, or the like. In this way, extra spaces and product redesigns for mounting a dedicated sensor to the product are no longer needed, which reduces the cost of the product. Furthermore, user experience can be improved without increasing costs.

In the following, a wearable device is taken as an example to describe how to determine the at least one impact factor. For the embodiments where the apparatus 100 comprises a wearable device such as a mask, after research, the at least one affecting factor comprises three affecting factors. For ease of discussion, the three affecting factors will be referred to as first, second and third affecting factors as mentioned above, respectively. Specifically, the first affecting factor is a factor affecting the temperature change rate, the second affecting factor affects the sensed temperature, and the third affecting factor affects an intermediate temperature determined based on the sensed temperature and the temperature change rate.

As mentioned above, in some embodiments, the affecting factors are associated with the parameters including, but not limited to, the equivalent thermal conductivities around the sensor, power generated by active components on the PCB, and the temperature of the fixed heat source 202, i.e., a human body. Consequently, the three affecting factors may be determined based on the above parameters.

Specifically, after analyses, the inventors have found that, in some embodiments, the first affecting factor may be determined at least based on the power generated by the active components on the PCB and an equivalent thermal conductivity around the sensor, which is referred to as a first equivalent thermal conductivity for ease of discussion. The first equivalent thermal conductivity may be associated with an equivalent thermal conductivity from the physical environment to the sensor 101, and an equivalent thermal conductivity from the PCB to the environment.

As for the second affecting factor, in some embodiments, the second affecting factor may be determined at least based on the power generated by active components on the PCB, and a second equivalent thermal conductivity around the sensor 101. The second equivalent thermal conductivity may be associated with an equivalent thermal conductivity from the variable heat source 201 such as the physical environment to the sensor 101, an equivalent thermal conductivity from the PCB to the physical environment, an equivalent thermal conductivity from the fixed heat source 202 such as a constant temperature object to the sensor 101, and an equivalent thermal conductivity from the PCB to the constant temperature object.

As for the third affecting factor, in some embodiments, the third affecting factor may be determined at least based on the temperature of the fixed heat source 202, the power generated by the active components on the PCB, and a third equivalent thermal conductivity around the sensor 101. The third equivalent thermal conductivity may be associated with an equivalent thermal conductivity from the variable heat source 201 such as the physical environment to the sensor 101, an equivalent thermal conductivity from the PCB to the physical environment, an equivalent thermal conductivity from the fixed heat source 202 such as a constant temperature object to the sensor 101, and an equivalent thermal conductivity from the PCB to the constant temperature object.

It can be seen from the above that in some embodiments, the affecting factors may be determined at least based on, for example, thermal conductivities around the sensors 101, the temperature of the fixed heat source, and the power generated by the active components. For example, in the case of masks, the above parameters are relatively constant for the same batch of the masks. As a result, the first, second, and third affecting factors are constant.

It is to be understood that the above embodiments where the affecting factors may be determined based on the above mentioned parameters are merely for illustrative purpose, without suggesting any limitations as to the scope of the present disclosure. The affecting factors may also be determined in other suitable ways.

For example, in some alternative embodiments, the affecting factors may also be determined by calibration. "Calibration" means that the affecting factors can be determined in the case where the temperature of the variable heat source 201 and the sensed temperature of the sensor 101 are known. Specifically, to determine or calibrate the affecting factors, a plurality of temperatures of the variable heat source 201, i.e., the ambient temperature may be obtained with a further sensor over a plurality of predetermined periods of time T1, T2 and T3, as shown in FIG. 3.

In the meantime, a start temperature and an end temperature sensed by the sensor 101 for a predefined time slot within each of the plurality of predetermined periods of times T1, T2, and T3 are obtained. After that, affecting factors can be determined or calibrated at least based on the plurality of temperatures of the variable heat source 201.

The method of determining or calibrating the affecting factors will be described below with reference to FIG. 3 by way of example. Specifically, to accomplish the above determination or calibration, one person wearing a mask with the sensor 101 inside stands and walks inside a room (T=~−6° C.) for 75 minutes first, then goes to the outside (T~~20° C.) to stand and walk for 16 minutes. During these periods, the ambient temperature is obtained from a further sensor, for example, a common thermometer.

The sensed temperatures by the sensor 101 inside the mask with respect to the predetermined periods of time are shown in FIG. 3. It is obvious that the sensed temperature by the sensor 101 cannot reflect the ambient temperature directly. Because three affecting factors are to be determined for the case of masks, three periods of time T1, T2, T3 are chosen to determine the affecting factors. Furthermore, as shown in FIG. 3, durations of the three periods of time T1, T2, T3 may be different. During the three periods of time, the ambient temperature, the start and end temperatures and the time are obtained and recorded, as shown in Table 1 below. In some embodiments, the ambient temperatures in Table 1 are averages of the ambient temperatures sensed by the common thermometer during a predetermined period of time, for example, 60 seconds.

TABLE 1

| Ambient | T1 −6 | | T2 −6 | | T3 20 | |
|---|---|---|---|---|---|---|
| T (° C.) | Start T. | End T. | Start T. | End T. | Start T. | End T. |
| Time (0.1 s) | 1026 | 2130 | 12081 | 15257 | 46001 | 47005 |
| Sensed T (° C.) | 19.76 | 17.34 | 10.65 | 10.42 | 11.55 | 14.92 |

From the above data as listed in Table 1, the affecting factors, i.e., the first, second and third affecting factors can be determined by three ternary linear equations. As can be seen from the above Table 1, to ensure the determination of the affecting factors with the above methods, in some embodiments, the plurality of the temperatures of the variable heat source 201 to be sensed by the further sensor are different. In some embodiments, the term "different" means that the temperatures of the variable heat source 201 in the different predetermined periods of time are different. In some embodiments, alternatively or additionally, the term "different" may also mean that the temperatures of the variable heat source 201 in one predetermined period of time are different or changed.

It can be seen from the above that according to embodiments of the present disclosure, temperatures during merely three periods of time are needed to determine the affecting factors. This greatly reduces efforts required to determine parameters as mentioned above and the affecting factors, and improves product development efficiency.

Furthermore, taking into account the instability of the sensor at the beginning of measurement, the predefined time slot when the start and end temperatures are obtained is arranged in the middle of the predetermined periods of time. In this way, the determined affecting factor can be more accurate.

In some embodiments, after the affecting factors are determined through the various methods described above, the determined affecting factors may be built in a processor or a control unit or memory of the apparatus 100. When a user wears an active mask with the apparatus 100, the ambient temperature may be determined based on the sensed temperature, the temperature change rate of the sensor 101 and the determined affecting factors.

In this way, for the active mask, the fan speed can be adjusted according to the above determined ambient temperature, without any need for dedicated sensors. As a result, the costs for the active mask are reduced while improving the user's experience.

According to another aspect of the present disclosure, the apparatus 100 for temperature detection is provided. Generally, the apparatus 100 comprises a sensor 101 and a processor coupled to the sensor 101. As mentioned above, the sensor 101 is thermally radiated by the variable heat source 201 and a fixed heat source 202 when in the mounted mode, as shown in FIG. 1. The processor can perform steps of the method as mentioned above to determine the temperature of the variable heat source 201.

In some embodiments, the apparatus 100 may be arranged in a wearable device such as a mask. When the wearable device is worn by a constant temperature object such as a human body serving as the fixed heat source, the temperature of a physical environment serving as the variable heat source 201 can be determined.

According to yet another aspect of the present disclosure, a wearable device is provided. The wearable device comprises the apparatus 100, as mentioned above. In some embodiments, the apparatus 100 may be arranged on a side of the wearable device adjacent to the constant temperature object such as a human body. In this way, the temperature of the constant temperature object inside the wearable device can be more constant, resulting in a more accurate determination of the ambient temperature.

It should be appreciated that the above detailed embodiments of the present disclosure are only to exemplify or explain principles of the present disclosure and not to limit the present disclosure. Therefore, any modifications, equivalent alternatives and improvements, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

The invention claimed is:

1. A method for determining a temperature of a physical environment around a wearable device, comprising:

obtaining a sensed temperature from a sensor indicating an internal temperature inside the wearable device, the sensor being in a mounted mode on a constant temperature object wearing the wearable device where the sensor is thermally radiated by the physical environment and the constant temperature object wearing the wearable device;

determining, based on the sensed temperature from the sensor, a temperature change rate of the sensor and at least one affecting factor that affects temperature sensing of the sensor, wherein the at least one affecting factor comprises a first affecting factor A, a second affecting factor B and a third affecting factor C, the affecting factors A, B and C being constants; and determining the temperature of the physical environment based on the sensed temperature, the temperature change rate and the affecting factors A, B and C, wherein the temperature of the physical environment is determined by $$T_{env} = A \cdot \frac{dT_{NTC}}{dt} + B \cdot T_{NTC} + C$$

wherein $T_{env}$ denotes the environmental temperature, $T_{NTC}$ is the sensed temperature of the sensor, A denotes the first affecting factor that affects the temperature change rate, B denotes the second affecting factor that affects the sensed temperature, and C denotes the third affecting factor determined based on a temperature of the constant temperature object that affects an intermediate temperature determined based on the sensed temperature and the temperature change rate.

2. The method of claim 1, wherein determining the at least one affecting factor comprises:

determining the first affecting factor based on a power generated by an active component on a printed circuit board (PCB) where the sensor is mounted, and a first equivalent thermal conductivity around the sensor, wherein the first equivalent thermal conductivity is associated with an equivalent thermal conductivity ($\lambda_{env}$) from the physical environment to the sensor and an equivalent thermal conductivity ($\lambda_{pcb1}$) from the PCB to the physical environment.

3. The method of claim 1, wherein determining the at least one affecting factor comprises:

determining the second affecting factor based on a power generated by an active component on a printed circuit board (PCB) where the sensor is mounted, and a second equivalent thermal conductivity around the sensor, wherein the second equivalent thermal conductivity is associated with an equivalent thermal conductivity ($\lambda_{env}$) from the physical environment to the sensor, an equivalent thermal conductivity ($\lambda_{pcb1}$) from the PCB to the physical environment, an equivalent thermal conductivity ($\lambda_{face}$) from the constant temperature object to the sensor, and an equivalent thermal conductivity ($\lambda_{pcb2}$) from the PCB to the constant temperature object.

4. The method of claim 1, wherein determining the at least one affecting factor comprises:

determining the third affecting factor based on a temperature of the constant temperature object, a power generated by an active component on a printed circuit board (PCB) where the sensor is mounted, and a third equivalent thermal conductivity around the sensor, wherein a second equivalent thermal conductivity is associated with an equivalent thermal conductivity ($\lambda_{env}$) from the physical environment to the sensor, an equivalent thermal conductivity ($\lambda_{pcb1}$) from the PCB to the physical environment, an equivalent thermal conductivity ($\lambda_{face}$) from the constant temperature object to the sensor, and an equivalent thermal conductivity ($\lambda_{pcb2}$) from the PCB to the constant temperature object.

5. The method of claim 1, wherein determining the temperature change rate comprises:

obtaining a plurality of historical temperatures sensed by the sensor over a period of time; and determining the change rate based on the plurality of historical temperatures and the period of time.

* * * * *